United States Patent
Hayashi (10) Patent No.: US 10,306,093 B2
(45) Date of Patent: May 28, 2019

(54) IMAGE FORMING APPARATUS THAT FACILITATES CONFIRMATION OF ORDER OF PAGES AND IMAGE FORMING SYSTEM

(71) Applicant: Kyocera Document Solutions Inc., Osaka (JP)

(72) Inventor: Shinji Hayashi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/883,123

(22) Filed: Jan. 30, 2018

(65) Prior Publication Data

US 2018/0220029 A1 Aug. 2, 2018

(30) Foreign Application Priority Data

Jan. 30, 2017 (JP) .................. 2017-014035

(51) Int. Cl.
| | | |
|---|---|---|
| *H04N 1/00* | (2006.01) | |
| *H04N 1/21* | (2006.01) | |
| *G03G 15/00* | (2006.01) | |

(52) U.S. Cl.
CPC ....... *H04N 1/2162* (2013.01); *G03G 15/5062* (2013.01); *G03G 15/55* (2013.01);
(Continued)

(58) Field of Classification Search
CPC . G03F 1/30; G03F 7/20; G03F 7/2035; G03F 9/7088; G03F 9/7092; G06F 3/121; G06F 3/1234; G06F 3/1259; G06F 3/1282; G06F 3/1293; G06F 17/27; G06F 3/04855; G06F 3/0488; G06K 15/022; G06K 15/408; B41J 2/325; B41J 31/00; B41M 5/52; H04N 1/00132; H04N 1/00143; H04N 1/00175; H04N 1/00347; H04N 1/00442; H04N 1/00453; H04N 1/00485; H04N 1/32133; H04N 2201/0041; H04N 2201/0049; H04N 2201/0081; H04N 2201/0082; H04N 2201/0087;
(Continued)

(56) References Cited

U.S. PATENT DOCUMENTS

| | | | | |
|---|---|---|---|---|
| 5,642,201 A | * | 6/1997 | Hayashi | ................. H04N 1/028 250/201.2 |
| 5,684,600 A | * | 11/1997 | Miyazaki | ........... H04N 1/40062 358/2.1 |
| 6,010,258 A | * | 1/2000 | Tomita | ..................... B41J 2/325 347/172 |

(Continued)

FOREIGN PATENT DOCUMENTS

| | | |
|---|---|---|
| JP | 2004-202852 A | 7/2004 |
| JP | 2004-229236 A | 8/2004 |
| JP | 2010-076303 A | 4/2010 |

*Primary Examiner* — Negussie Worku
(74) *Attorney, Agent, or Firm* — HEA Law PLLC (57) ABSTRACT

An image forming apparatus includes an identification-mark making unit. The identification-mark making unit makes a page identification mark for identifying a page, on a predetermined position of a paper sheet during printing. The identification-mark making unit, based on the page identification mark made in a previous printing, includes a correction/addition mark that indicates an existence of a correction page or an additional page since the previous printing in a part of the page identification mark when a new print output is performed.

8 Claims, 6 Drawing Sheets

(52) U.S. Cl.
CPC ............... *H04N 1/00761* (2013.01); *G03G 2215/00569* (2013.01); *H04N 2201/0094* (2013.01)

(58) Field of Classification Search
CPC ... H04N 2201/3226; H04N 2201/3232; H04N 2201/3242; H04N 2201/325; H04N 2201/3271
USPC .............. 358/1.9, 1.11, 1.15, 3.28, 400, 505
See application file for complete search history.

(56) References Cited

U.S. PATENT DOCUMENTS

| | | | | |
|---|---|---|---|---|
| 7,027,187 | B1* | 4/2006 | Zuber | H04N 1/00002 358/1.9 |
| 7,898,698 | B2* | 3/2011 | Shimokawa | H04N 1/58 101/181 |
| 2007/0019018 | A1* | 1/2007 | Wakai | H04N 1/00143 347/14 |
| 2011/0236111 | A1* | 9/2011 | Fujii | G03G 15/238 400/583 |
| 2012/0242773 | A1* | 9/2012 | Yasumatsu | B41M 5/38264 347/203 |
| 2013/0275867 | A1* | 10/2013 | Inoue | G06F 17/27 715/277 |
| 2015/0022845 | A1* | 1/2015 | Roscoe | G06K 15/408 358/1.14 |
| 2015/0170011 | A1* | 6/2015 | Hattori | G06K 15/408 358/1.6 |
| 2016/0132756 | A1 | 5/2016 | Yamamuro | |
| 2016/0292543 | A1* | 10/2016 | Oishi | H04N 1/00938 |
| 2016/0364193 | A1* | 12/2016 | Yu | G06F 3/1241 |

\* cited by examiner

IMAGE FORMING APPARATUS THAT FACILITATES CONFIRMATION OF ORDER OF PAGES AND IMAGE FORMING SYSTEM

INCORPORATION BY REFERENCE

This application is based upon, and claims the benefit of priority from, corresponding Japanese Patent Application No. 2017-014035, filed in the Japanese Patent Office on Jan. 30, 2017, and the entire contents of which are incorporated herein by reference.

BACKGROUND

Unless otherwise indicated herein, the description in this section is not prior art to the claims in this application and is not admitted to be prior art by inclusion in this section.

The present disclosure relates to an image forming apparatus and an image forming system. There is a technique that, when a typical image forming apparatus performs printing, marks are printed as being displaced off on end portions of paper sheets in accordance with its order of pages. This technique ensures immediate and visual confirmation of the order of pages and page missing.

SUMMARY

An image forming apparatus according to one aspect of the disclosure includes an identification-mark making unit. The identification-mark making unit makes a page identification mark for identifying a page, on a predetermined position of a paper sheet during printing. The identification-mark making unit, based on the page identification mark made in a previous printing, includes a correction/addition mark that indicates an existence of a correction page or an additional page since the previous printing in a part of the page identification mark when a new print output is performed.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiments") with reference to the drawings.

The inventor has examined a method that can confirm an order by mark. As a consequence of this examination, the inventor has additionally found an event that, when correction of a page had occurred, it is impossible to determine whether replacement to a corrected one has been accurately performed, and an event that, when correction/addition of the page has occurred, a state where it is impossible to immediately and visually determine whether the order of the pages at this correction part is right has occurred.

Figure 1A:
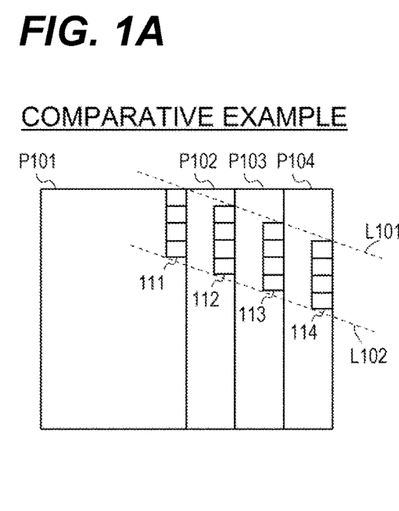
FIGS. 1A to 1D illustrate comparative examples where page identification marks are made on printing paper sheets.
Figure 1B:
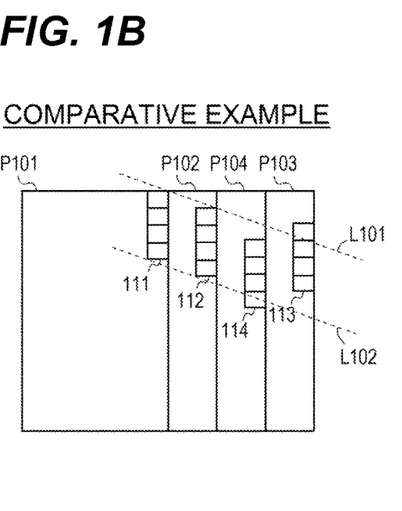
Figure 1C:
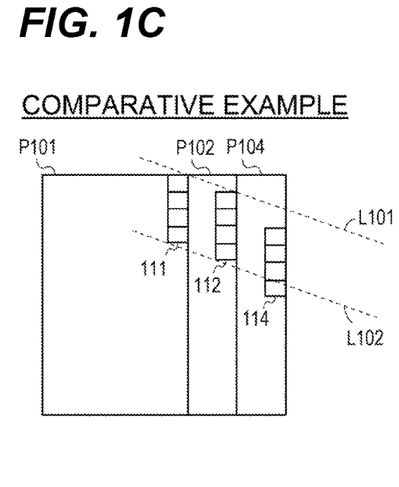
Figure 1D:
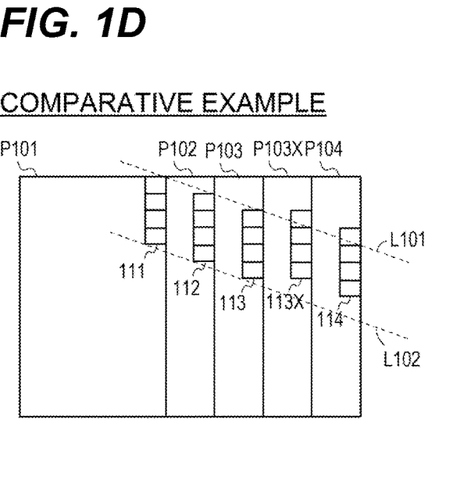

FIGS. 1A to 1D illustrate comparative examples where page identification marks are made on printing paper sheets. FIG. 1A illustrates an initial state of four print output paper sheets (a print output first page P101 to a print output fourth page P104) on which marks are made. On right edge regions of the respective pages, page identification marks 111 to 114 for identifying a page order are made. The respective page identification marks 111 to 114 are printed displaced off downward with a predetermined width. When the four print output first page P101 to print output fourth page P104 are arranged with partially overlapping, the page identification marks 111 to 114 are methodically arranged between two parallel oblique virtual lines L101 and L102. Provisionally, as in FIG. 1B, when the order of the print output third page P103 and the print output fourth page P104 is exchanged, the page identification marks 113 and 114 protrude from the above-described virtual lines L101 and L102. Thus, the fact that the order is different can be easily determined even by visual check. FIG. 1C illustrates a state where the print output third page P103 has been removed from the state in FIG. 1A. When the removal is intentionally performed, for example, if the number of whole pages is little, appropriateness can be detected. However, when the removal is unintentionally performed, and when the number of whole pages is large, determination whether it is appropriate or not is sometimes difficult. FIG. 1D illustrates a state where an additional print output P103X has been added between the print output third page P103 and the print output fourth page P104. When the page is simply added, identical marks (the page identification mark 113 and an additional page identification mark 113x) are arranged. Thus, it is impossible to determine whether the order is appropriate or not. When the identical marks are made, it is impossible to determine what sort of status page has been added.

Figure 2:
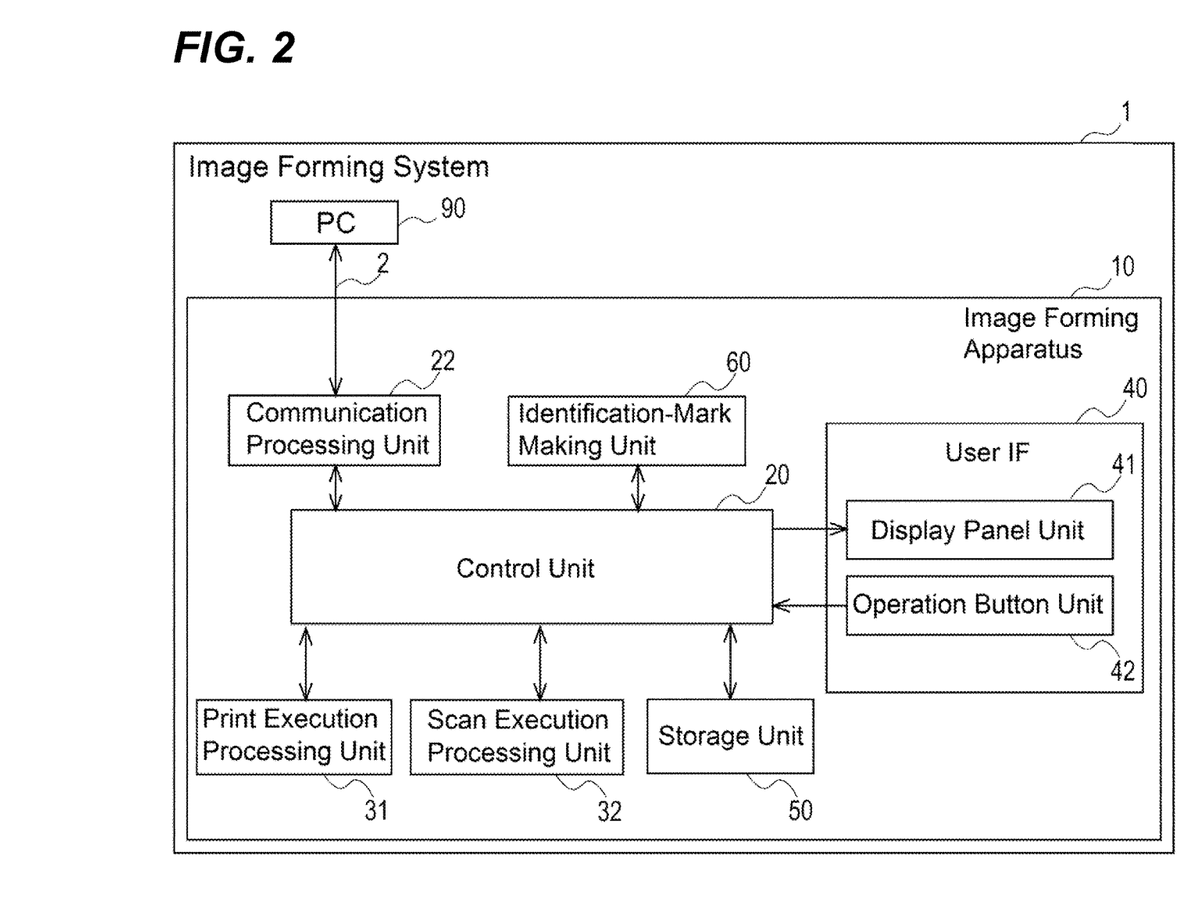
FIG. 2 illustrates a function block diagram illustrating a schematic configuration of an image forming system according to one embodiment of the disclosure.

FIG. 2 illustrates a function block diagram illustrating a schematic configuration of an image forming system 1. The image forming system 1 includes an image forming apparatus 10, and a PC 90 connected to the image forming apparatus 10 via a network 2.

The image forming apparatus 10, which is, for example, an MFP (multi-functional peripheral), has a plurality of functions such as a printing function, a scan function, and a FAX function.

Specifically, the image forming apparatus 10 includes a control unit 20, a communication processing unit 22, a print execution processing unit 31, a scan execution processing unit 32, a user IF 40, a storage unit 50, and an identification-mark making unit 60.

The communication processing unit 22, which is a communication interface such as a wired LAN, a wireless LAN, or a USB communication, is communicatively connected to a client terminal (terminal device) such as the PC 90 via the network 2.

The control unit 20 includes, for example, a microprocessing unit (MPU), a read-only memory (ROM), and a random-access memory (RAM), and integrally controls respective configuration components to perform a print output process, a reading process of an original document and similar document, a status monitoring process of operation of the configuration components, a user management, an operation control, and similar process.

The storage unit 50, which is, for example, a built-in storage device such as high-capacity HDD and SSD, once accumulates a print job in the print execution processing unit 31 and a transmitting job from the scan execution processing unit 32 before execution. The accumulated data is held for a specific period.

The print execution processing unit 31 has a general print execution function to execute a printing operation by an instruction from the control unit 20. The scan execution processing unit 32 has a general configuration and includes, for example, a scanner, a platen glass, and a document reading slit to execute the reading process of the original document.

The user IF 40 includes a display panel unit 41 and an operation button unit 42. The display panel unit 41 displays status information, operation information, and similar information regarding the image forming apparatus 10. The operation button unit 42 accepts user's operation with respect to the image forming apparatus 10. When there is a touch panel type IF or a physical button IF integrally constituted with the display panel unit 41, the operation button unit 42 may be an interface that combines them.

The identification-mark making unit 60 executes and processes a process that makes the page identification mark on the printing paper sheet, which is a distinctive function in this embodiment, in cooperation with other configurations. The identification-mark making unit 60, when making the page identification mark on printing paper sheet, records its making log. Then, when there is correction on a content of the print output, and the replacement occurs, and when the page is added, the identification-mark making unit 60 reflects information on the occurrence of this correction/addition on the page identification mark. Thus, the identification-mark making unit 60 may be configured to store and hold information on the made page identification mark when a print output is performed.

The page-identification-mark making process executed by the identification-mark making unit 60 will be described with reference to FIGS. 3A to 6. As a basic technique that combines the page identification mark with a print image to output, a general known technique can be used. In the following, the description is performed mainly focusing on a distinctive point in this embodiment.

Figure 3A:
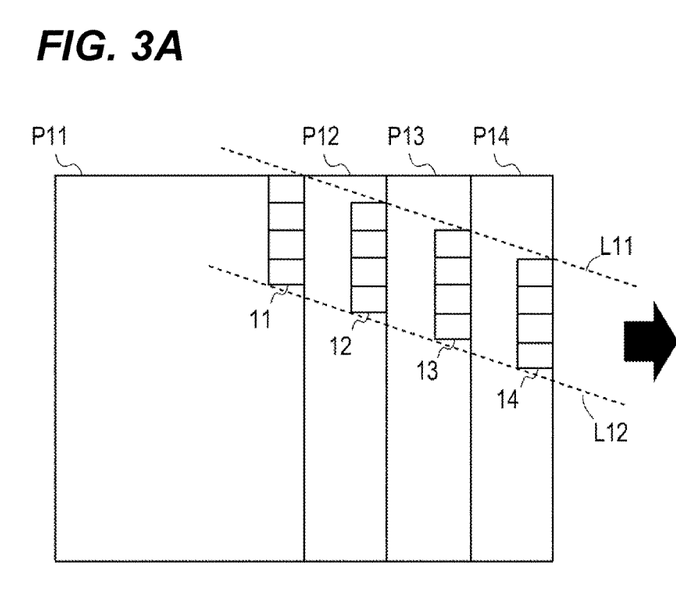
FIGS. 3A and 3B illustrate explanatory diagrams of an exemplary mark-making where correction is partially performed.
Figure 3B:
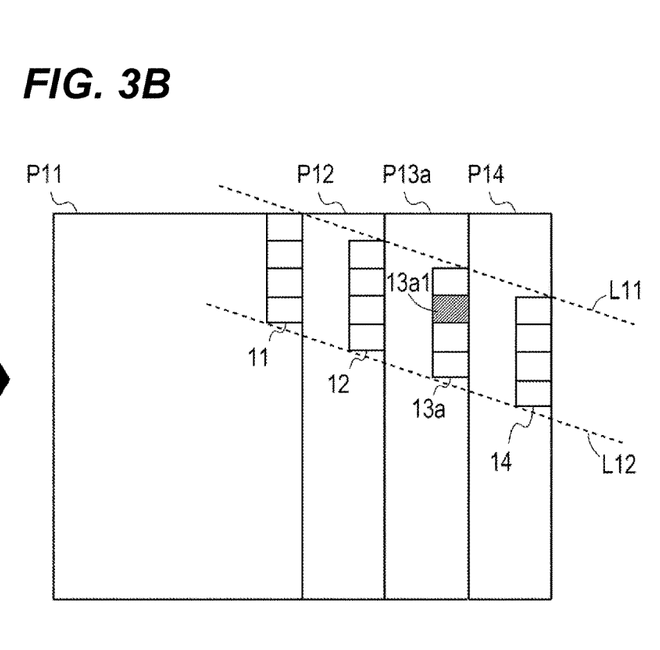

FIGS. 3A and 3B illustrate explanatory diagrams of an exemplary mark-making when the correction is partially performed. FIG. 3A illustrates an initial state of four print output paper sheets (a print output first page P11 to a print output fourth page P14) on which marks are made.

As illustrated, on regions of right end portions of the respective pages, page identification marks 11 to 14 are made to identify the order of pages. The page identification marks 11 to 14 have shapes that four rectangles are alongside arranged vertically. As the page proceeds, the page identification marks 11 to 14 are printed displaced off downward with a predetermined width. When the four print output first page P11 to print output fourth page P14 are arranged with partially overlapping, the page identification marks 11 to 14 are methodically arranged between parallel virtual lines L11 and L12 that obliquely extend.

FIG. 3B illustrates a state where the correction has been partially performed. Here, a state where a correction print output third page P13a on a third page has been corrected is illustrated. At a page identification mark 13a in this page, a correction/addition mark 13a1 that indicates that it has been already corrected or added is additionally made on the second top rectangle. As the correction/addition mark 13a1, compare with the page identification mark 13 in the initial state, a mark on which a different color or a predetermined pattern is given is taken. This facilitates determination that the correction print output third page P13a is arranged at an appropriate position, that is, the order of the print output paper sheets is accurately set.

Figure 4:
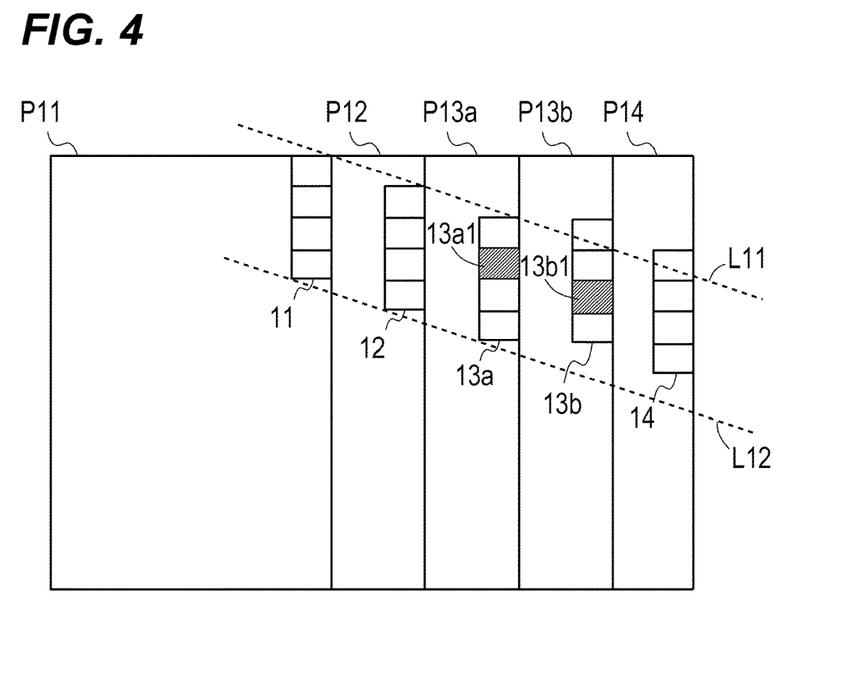
FIG. 4 illustrates an explanatory diagram of an exemplary mark-making when correction and page addition are performed.

FIG. 4 illustrates an explanatory diagram of an exemplary mark-making when the correction and the page addition have been performed. For the correction print output third page P13a, the mark identical to that in FIG. 3B is made. In an addition print output third page P13b that is an additional page, a position on which a page identification mark 13b is made is identical, but a correction/addition mark 13b1 in the page identification mark 13b is made on the one level lower positioned rectangle. Thus making the correction/addition marks 13a1 and 13b1 ensures right setting of the order of the correction page and the additional page, and even when the correction page and the addition page are set by mistake, detection of the mistake is made easier.

Figure 5:
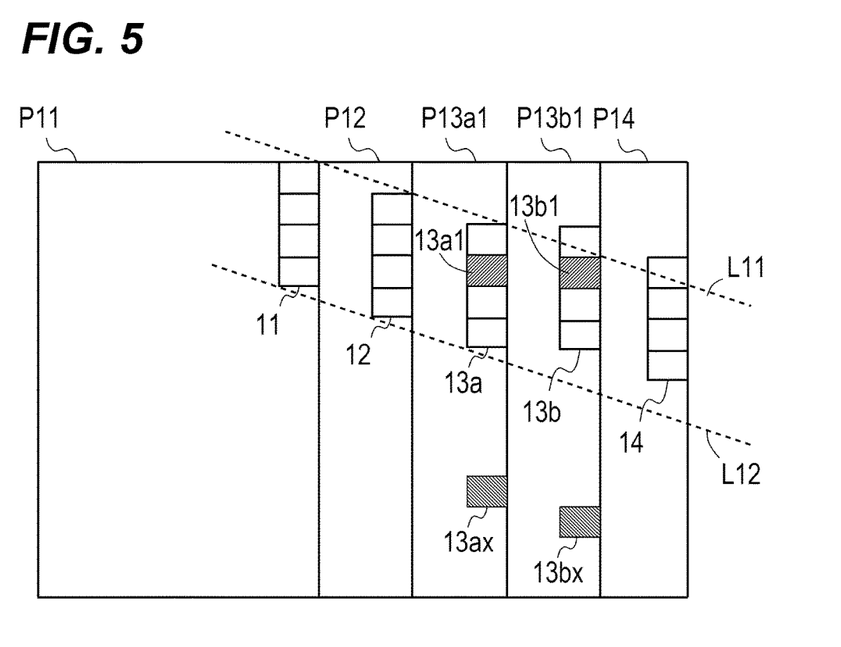
FIG. 5 illustrates an explanatory diagram of another exemplary mark-making when correction and page addition are performed.

FIG. 5 illustrates an explanatory diagram of another exemplary mark-making when the correction and the page addition are performed. A point different from FIG. 4 is that the positions on which the correction/addition marks 13a1 and 13b1 are made are both the second top rectangles. At this rate, the order of the correction print output third page P13a1 and the addition print output third page P13b1 is substantially unknown. Therefore, on regions outside the page identification marks 13a and 13b, here, lower regions, respective order specification marks 13ax and 13bx are made. The order specification mark 13ax in the correction print output third page P13a1 is positioned above the order specification mark 13bx in the addition print output third page P13b1. A positional relationship between the two order specification marks 13ax and 13bx facilitates determination of the order of the correction print output third page P13a1 and the addition print output third page P13b1. Such a mark-making method is effective especially when all the correction/addition marks 13a1 and 13b1 cannot be made within the page identification marks 13a and 13b, for example, in a case where the number of the additional pages is large (for example, five pages are added). Thus, the identification-mark making unit 60 may be configured to make the order specification mark that ensures detection of an order of the correction page or the additional page on a position different from a position of the page identification mark when the identification-mark making unit 60 has determined that the correction/addition mark is uncontainable in the page identification mark.

Figure 6:
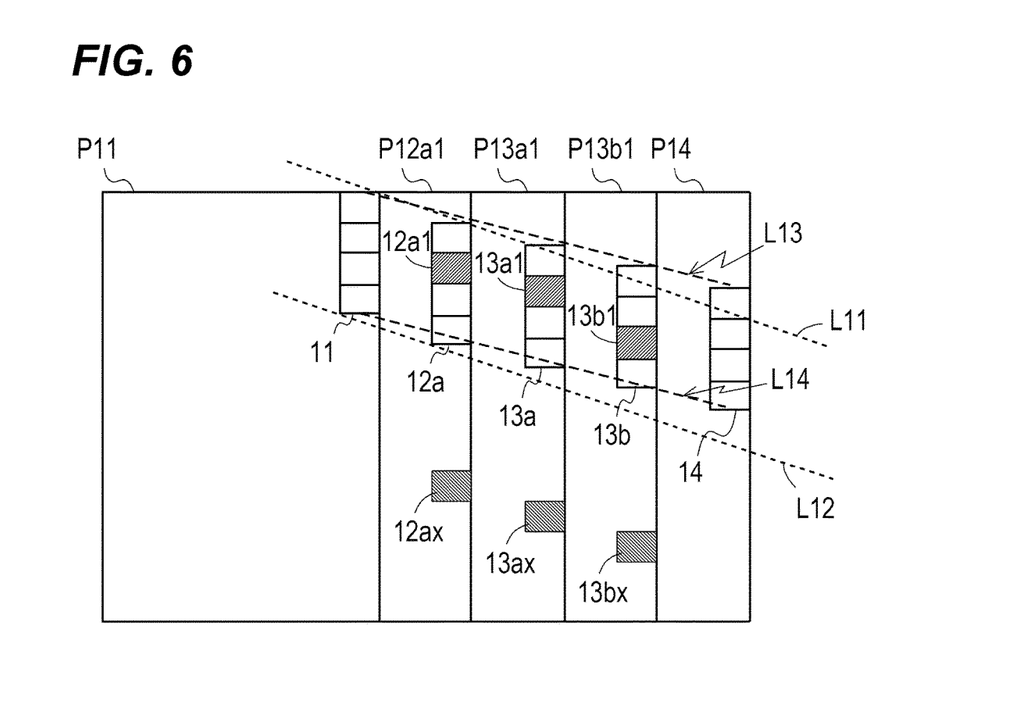
FIG. 6 illustrates an explanatory diagram of another further exemplary mark-making when correction and page addition are performed.

FIG. 6 illustrates an explanatory diagram of another further exemplary mark-making when the correction and the page addition are performed. A case where there are a plurality of correction and addition pages that are continuous is assumed. The continuous plurality of pages, here, pages between the print output first page P11 and the print output fourth page P14 are corrected and added. More specifically, between these pages, a correction print output second page P12a1, a correction print output third page P13a1, and an addition print output third page P13b1 are set.

In the correction print output second page P12a1, a correction/addition mark 12a1 is made on the second top rectangle of the page identification mark 12a. In the correction print output third page P13a1, the correction/addition mark 13a1 is made on the second top rectangle of the page identification mark 13a. In the addition print output third page P13b1, the correction/addition mark 13b1 is made on the third top rectangle of the page identification mark 13b. Furthermore, the three page identification marks 12a, 13a, and 13b are made along lines L13 and L14 that connects the page identification mark in the page before the correction/addition pages (the page identification mark 11 in the print output first page P11) to the page identification mark in the page after the correction/addition pages (the page identification mark 14 in the print output fourth page P14). Thus deciding the position on which the mark is printed to make the mark can visually give an impression that is continuous.

Figure 7:
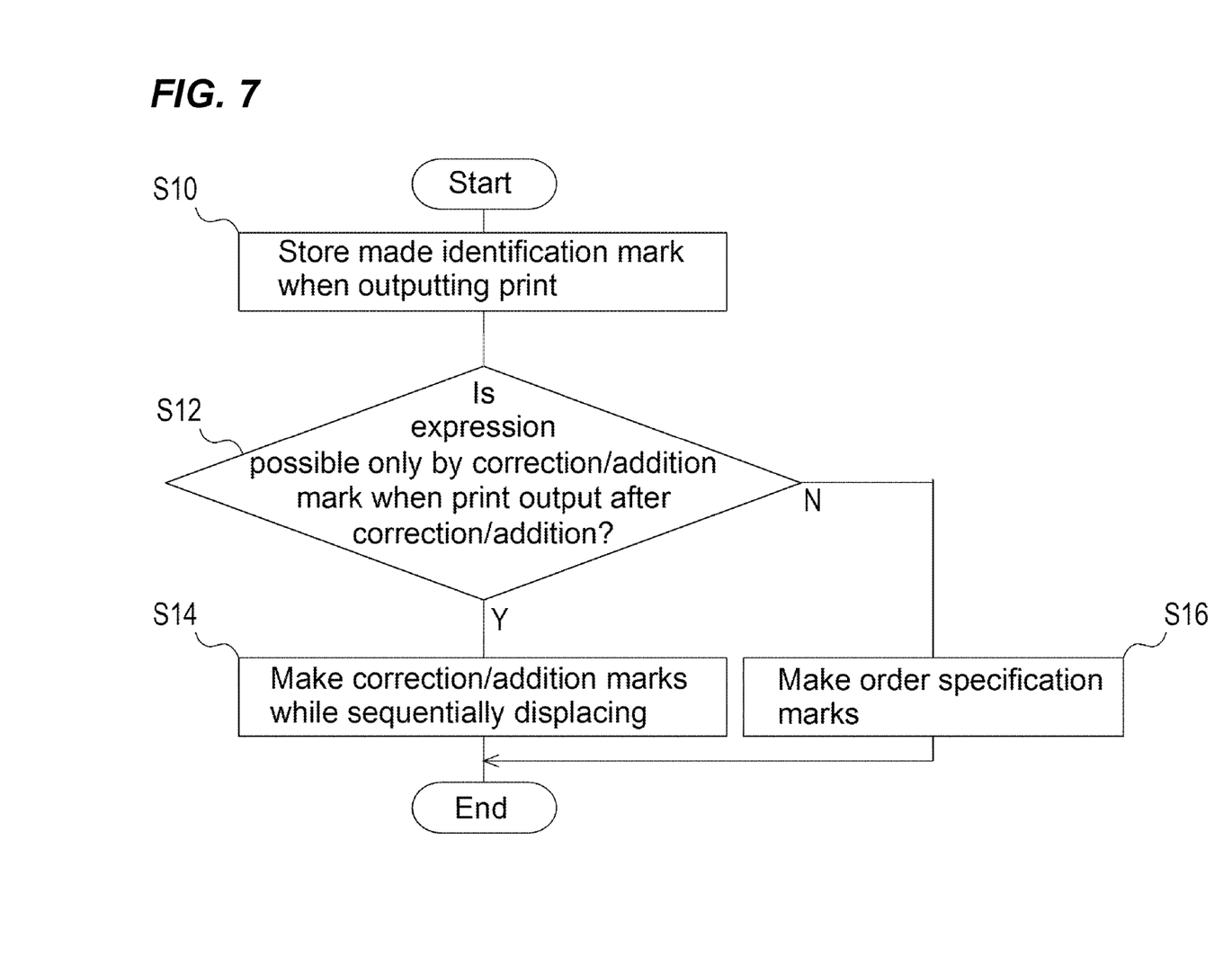
FIG. 7 illustrates a page-identification-mark making process.

The above-described page-identification-mark making process will be collectively described using a flowchart in FIG. 7. The identification-mark making unit 60 reads and stores the position of the mark made on the page that is corrected/added and its size by a log during printing or by scanning an actual paper sheet (Step S10). When the log during printing is used, the identification-mark making unit 60 stores information (the position and the shape) of the page identification mark made during printing in a predetermined storage region. When outputting after the correction/addition, the identification-mark making unit 60 stores its correction information, that is, information on the page identification mark, the correction/addition mark, and the order specification mark in the predetermined storage region. Thus, the identification-mark making unit 60 may be configured to scan the paper sheet on which the page identification mark is made to acquire information on the page identification mark.

The identification-mark making unit 60, when printing the corrected/added page, based on the number of pages that is corrected/added, makes the correction/addition mark only within the page identification mark to determine whether it is possible to accurately express the order (Step S12).

The identification-mark making unit 60, when determining that it is possible to deal with only within the page identification mark (Y at Step S12), creates the correction/addition mark within the page identification mark, and then, for example, as illustrated in FIGS. 3B, and 4, prints the correction/addition marks as being displaced off in accordance with the order of the correction/addition pages as necessary (Step S14).

The identification-mark making unit 60, when determining that the it is impossible to deal with only within the page identification mark (N at Step S12), repeatedly prints the correction/addition marks as being displaced off on the conventional mark positions. Then, the identification-mark making unit 60 adds the marks (the order specification marks) based on the continuous pages, on other positions in the paper sheets (Step S16). The correction/addition marks at the original positions are displaced off for confirming whether the order of the pages is exchanged or not in a simple way.

The position of the paper sheet on which the mark is made is changeable depending on the content to be printed. Even when right and left ends cannot be used, for example, by printing without margins, the mark can be made using upper and lower ends.

As described above, with this embodiment, even when the replacement of the print and the additional page occur with respect to one where the mark has been printed on an end portion of the paper sheet in accordance with the order of the pages, the order of the pages can be confirmed, and the fact that the correction and the addition are performed in the right order can be immediately visually confirmed. Therefore, the mark is printed on the position identical to the mark position corresponding to the page that is corrected/added. Then, within this mark, for example, a mark on a colored background that indicates that the change has been performed is located like a barcode. Then, when the additional page exists, the marked parts on the colored background are displaced off in accordance with the order of the pages to ensure the determination of the order of the pages.

As described above, the disclosure has been described based on the embodiment. Those skilled in the art will understand that this embodiment is an example, various modifications are possible in a combination of its respective components, and such modifications are also in a range of the disclosure. For example, the PC 90 may have the function of the identification-mark making unit 60. In this case, for example, this function is included in a printer driver executed in the PC 90 to ensure the execution of the mark-making function at a print setting timing when printing from the PC 90.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An image forming apparatus comprising:
a microprocessing unit and associated memory, configured as a control unit for integrally controlling print-executing, scan-executing, and page-order-identifying-mark labeling functions of the image forming apparatus;
a print execution processing unit functioning to execute printing operations on pluralities of paper-sheet pages according to instructions from the control unit, the printing operations including marginal printing of visually recognizable page-order-identifying marks on the paper-sheet pages;
a scan execution processing unit; and
a computer processor configured as an identification-mark labeling unit for creating visually recognizable page-order-identifying marks by controlling, via the control unit, the print execution processing unit to print page-identification marginal marks in systematically displaced marginal positions in a sequence of pages in a plurality of paper sheets; wherein
the identification-mark labeling unit is configured to label either a target correction page correcting a given page in the sequence of pages or a target addition page added into the sequence of pages, in a position where the page-identification marginal mark is labeled on the target correction page or the target addition page, with a page-identification marginal mark into which is added a correction/addition mark that makes the sequential order of the correction page or addition page visually recognizable.

2. The image forming apparatus according to claim 1, wherein if the identification-mark labeling unit determines that the correction/addition mark cannot be added into the page identification mark, the identification-mark labeling unit labels the target correction page or the target addition page with an order-identifying mark that makes the sequential order of the target correction page or the target addition page visually recognizable, in a marginal position different from the marginal position of the page-identification marginal mark.

3. The image forming apparatus according to claim 1, wherein the identification-mark labeling unit stores and holds information on the labeled page-identification marginal mark.

4. The image forming apparatus according to claim 1, wherein the identification-mark labeling unit is further configured to control, via the control unit, the scan execution processing unit to scan the paper-sheet pages labeled with the page-identification marginal marks, to acquire information on the page-identification marginal marks.

5. An image forming system comprising:
   an image forming apparatus furnished with
      a microprocessing unit and associated memory, configured as a control unit for integrally controlling print-executing and scan-executing functions of the image forming apparatus,
      a print execution processing unit functioning to execute printing operations on pluralities of paper-sheet pages according to instructions from the control unit, the printing operations including marginal printing of visually recognizable page-order-identifying marks on the paper-sheet pages, and
      a scan execution processing unit; and
   a terminal device having a print driver for the image forming apparatus, for controlling page-order-identifying-mark labeling functions of the image forming apparatus the print driver including an identification-mark labeling unit for creating visually recognizable page-order-identifying marginal marks by controlling, via the control unit, the print execution processing unit to print page-identification marginal marks in systematically displaced marginal positions in a sequence of pages in a plurality of paper sheets; wherein
   the identification-mark labeling unit is configured to label either a target correction page correcting a given page in the sequence of pages or a target addition page added into the sequence of pages, in a position where the page-identification marginal mark is labeled on the target correction page or the target addition page, with a page-identification marginal mark into which is added a correction/addition mark that makes the sequential order of the correction page or addition page visually recognizable.

6. The image forming system according to claim 5, wherein if the identification-mark labeling unit determines that the correction/addition mark cannot be added into the page identification mark, the identification-mark labeling unit labels the target correction page or the target addition page with an order-identifying mark that makes the sequential order of the target correction page or the target addition page visually recognizable, in a marginal position different from the marginal position of the page-identification marginal mark.

7. The image forming system according to claim 5, wherein the identification-mark labeling unit stores and holds information on the labeled page-identification marginal mark.

8. The image forming system according to claim 5, wherein the identification-mark labeling unit is further configured to control, via the control unit, the scan execution processing unit to scan the paper-sheet pages labeled with the page-identification marginal marks, to acquire information on the page-identification marginal marks.

\* \* \* \* \*